Nov. 14, 1944.  J. E. LEVIN  2,362,907
MEANS FOR MEASURING PIPES OR THE LIKE
Filed May 12, 1943
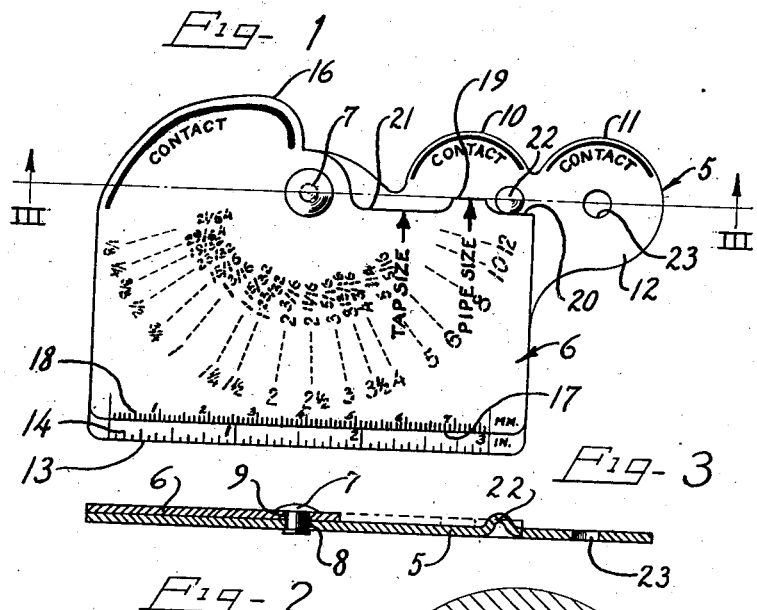
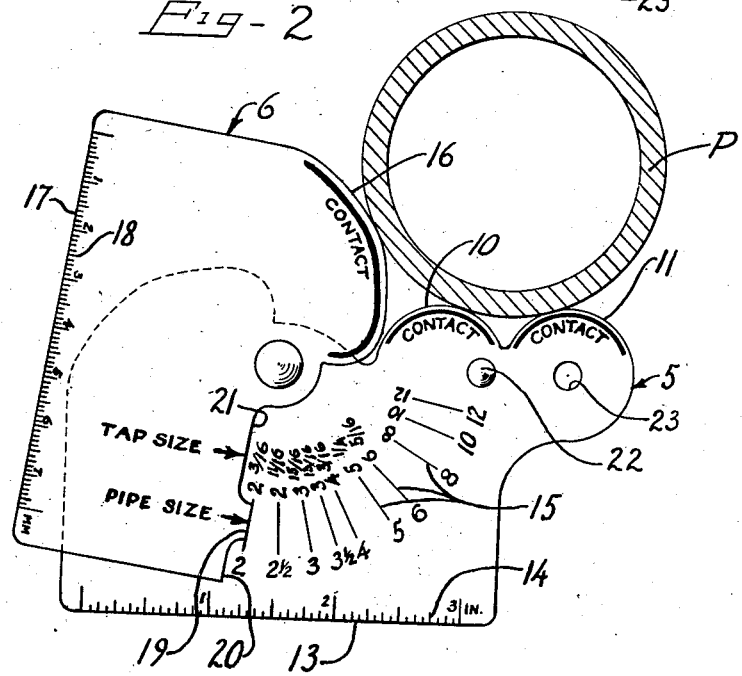
Inventor
JULIUS E. LEVIN
by Charles Hill Attys.

Patented Nov. 14, 1944

2,362,907

UNITED STATES PATENT OFFICE 2,362,907

MEANS FOR MEASURING PIPE OR THE LIKE

Julius E. Levin, Chicago, Ill.

Application May 12, 1943, Serial No. 486,701

3 Claims. (Cl. 33—178)

The present invention relates to a means for measuring arcuate or curved surfaces and may be advantageously employed in gauging the peripheries of pipes, rod and bar stock or the like. More particularly, the invention is concerned with a convenient pocket size gauge which is adapted to indicate such pertinent data as the tap size, the internal diameter of the pipe or other information, in addition to providing means for measuring the cross section of rod or bar stock or the like according to one or more different linear scales.

It is an object of the present invention to provide a device of the character described which is adapted to be set in one position to measure arcuate or curved surfaces and by means of another setting to provide a calibrated straight edge for accomplishing other desired measurements.

Another object of the invention is the provision of a device which is capable of providing a comparison between two or more different sets of measuring indicia whereby the measurements of objects may be determined according to any one or all of said scales.

It is a still further object of the present invention to provide a simple, efficient measuring gauge which may be used by inexperienced persons and yet be capable of rendering accurate information.

In accordance with the general features of the invention, there is provided a measuring gauge comprising a pair of cooperating members disposed in relatively pivotal and substantially overlying relation to each other, a scale on one of said members graduated to cover a range of sizes of objects to be measured, indicating means on the other of said members cooperating with said scale, cooperating elements on each of said members for contacting spaced points on the periphery of the objects to be measured, and a straight edge on at least one of said members.

The present invention also contemplates designating means associated with the indicating means for designating the specific measuring indicia associated with a given setting of the indicating means with respect to the scale corresponding to the setting of the members comprising the gauge.

Moreover, a straight edge may be provided on each of said gauge members which may be put to any of several important uses. For instance, measuring indicia of different systems may be applied to the straight edges for determining other desired information concerning objects to be measured, each of said scales being individually employed or disposed in cooperative relation for comparison of the data thus obtained. Numerous other advantages are to be found in the use of straight edges on the gauge.

Other objects and advantages of the present invention will be readily understood by those familiar with the art or will become apparent from the description of an embodiment of the invention illustrated in the accompanying drawing in which:

Figure 1 is a plan view of a device embodying the principles of the invention and shown in folded or compacted form;

Figure 2 represents a plan view of the device of Figure 1 shown in the position of use in measuring an object; and Figure 3 is a section from the line III—III of Figure 1.

The device illustrated in the accompanying drawing which represents but one embodiment of the invention comprises two plates 5 and 6 which may advantageously be formed of thin sheet metal, suitable plastic or other like material which has been molded, stamped or cut to form. Members 5 and 6 are adapted to be relatively pivotally mounted with respect to each other, a flat headed pin or rivet 7 being provided and passing through apertures 8 and 9 in said plates 5 and 6 respectively so as to connect said plates together in pivotal and overlying relation in the manner illustrated in Figure 1.

The plate 5 has formed at one end thereof a pair of arcuate contacting or caliper portions 10 and 11 of which portion 11 is formed on a lug 12 which projects from one edge of said plate 5. One edge of plate 5 such as, for example, the edge 13 which may advantageously be that opposite the contacting portions 10 and 11 is provided with a straight edge along which is disposed a scale, indicated by the reference character 14, which may be calibrated in any suitable fashion depending upon the character of the measurement for which said scale is intended to be employed. In the illustrated embodiment of the invention, the scale 14 has been shown as being calibrated in inches and the fractional parts thereof, although it will be understood that any suitable measuring indicia may be employed.

On the face of the plate 5 which is contiguous to the pivotally mounted and overlying plate 6 is provided a plurality of markings 15 which are arranged in substantially radial relation with respect to the center of the pin 7 about which plates 5 and 6 are pivotally mounted. Each of said markings 15 is provided with an associated numeral or character designation which corresponds to the size or characteristics of the object being measured by the device. In the illustrated embodiment of the invention which is adapted to be applied to the measurement of various sizes of pipe the character designations at one end of said markings 15 may be employed to indicate the internal diameter of the pipe while similar character designations may be employed at the opposite end of said markings to indicate the tap size.

The plate 6 is generally similar in shape to that of plate 5 but is lacking in the contacting points 10 and 11 and the projecting lug 12 thereof. Plate 6, on the other hand, is provided at one edge thereof with an irregularly curved contact surface 16 which cooperates with the arcuate contacting portions 10 and 11 of the plate 5 to contact the outer periphery of the object to be measured in the manner indicated in Figure 2 wherein the object P is being gauged. The edge of plate 6 which corresponds to the edge 13 of plate 5 is provided with a straight edge and a scale 18 thereon which, as before, may be calibrated in any suitable manner depending upon the character of the objects which it is desired to measure. In the device illustrated, the scale 18 has been calibrated according to the metric system.

On the edge of plate 6 adjacent to the contacting or caliper portion 16 thereof, is disposed a lug portion or indicator 19 on either side of which are formed the notched portions 20 and 21. When the contacting portions 10 and 11 of the plate 5 are placed in contact with the peripheral surface of the object P, for instance, and the plate 6 is rotated about the pin 7 so as to bring contacting portion 16 into contact with the peripheral surface of the object P, the indicator 19 will be positioned at one of the markings 15 which will correspond with the dimension or dimensions of the object P which are to be determined. In the illustrated device, when the indicator 19 registers with a marking 15 on the face of plate 5, the notched portions 20 and 21 will bracket one or more character designations associated with said marking 15. It will be understood that any of a number of correlated measurements may be associated with each of the markings 15.

An upstanding projection or button 22 is formed in the face of plate 5 at a point adjacent the contacting portions 10 and 11 thereof. The button 22 is intended to delimit the extent of rotation of the plate 6 with respect to the plate 5. Thus, when the contacting surface 16 of plate 6 is in contact with the button 22, the indicator 19 will register with the marking 15 which corresponds to the smallest dimension which the device is adapted to gauge. However, when the gauge is to be folded into its most compact form during non-use, the notched portion 20 will engage button 22. In this arrangement the plates 5 and 6 will substantially completely overlie each other and the edges 13 and 11 of said plates, respectively, will be positioned in substantially parallel relation, as indicated in Figure 1 of the drawing, thereby enabling the user to make comparative measurements on the scales 14 and 18 thereon if he so desires.

A hole 23 may advantageously be provided in projection 12 of plate 5 for convenience in hanging the gauge up when not in use.

It will, of course, be understood that various details of construction may be varied through a wide range without departing from the principles of this invention and it is, therefore, not the purpose to limit the patent granted hereon otherwise than necessitated by the scope of the appended claims.

What I claim is:

1. In a measuring device characterized by two elements disposed in relatively pivotal relation to each other, one of which elements has contacting means for engaging the arcuate or curved surface to be gauged and a scale made up of a plurality of measuring indicia while the other element is provided with indicating means on one edge thereof cooperating with the scale on the other of said elements and contacting means coacting with the contacting means on the other element to determine the position of the indicating means with respect to said scale, means associated with the indicating means for designating on the scale the specific one of the measuring indicia which corresponds to the setting of the indicating means with respect thereto, said designating means comprising a notched portion adjacent said indicating means.

2. In a measuring device characterized by two elements disposed in relatively pivotal relation to each other, one of which elements has contacting means for engaging the arcuate or curved surface to be gauged and a scale made up of a plurality of measuring indicia while the other element is provided with indicating means on one edge thereof cooperating with the scale on the other of said elements and contacting means coacting with the contacting means on the other element to determine the position of the indicating means with respect to said scale, means associated with the indicating means for designating on the scale the specific measuring indicia corresponding to the setting of the indicating means with respect to said scale, said designating means comprising a plurality of notched portions adjacent said indicating means.

3. In a measuring device characterized by two elements disposed in relatively pivotal relation to each other, one of which elements has contacting means for engaging the arcuate or curved surface to be gauged and a scale made up of a plurality of measuring indicia while the other element is provided with indicating means on one edge thereof cooperating with the scale on the other of said elements and contacting means coacting with the contacting means on the other element to determine the position of the indicating means with respect to said scale, means associated with the indicating means for designating on the scale the specific one of the measuring indicia which corresponds to the setting of the indicating means with respect thereto, said contacting means comprising a plurality of curved convex edges at least two being on one of said elements and one being on the other of said elements, said elements having straight edges opposite from said convex edges, arranged for parallel register with each other when the device is in a closed position.

JULIUS E. LEVIN.